(12) United States Patent
Kwon (10) Patent No.: US 7,725,649 B2
(45) Date of Patent: May 25, 2010

(54) RECORDING METHOD AND RECORDING APPARATUS USING SAME

(75) Inventor: Young-sig Kwon, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1229 days.

(21) Appl. No.: 10/674,477

(22) Filed: Oct. 1, 2003

(65) Prior Publication Data

US 2004/0068608 A1 Apr. 8, 2004

(30) Foreign Application Priority Data

Oct. 7, 2002 (KR) ............... 10-2002-0060967

(51) Int. Cl.
*G06F 12/00* (2006.01)
*G11B 7/00* (2006.01)
(52) U.S. Cl. .................. 711/112; 711/111; 369/47.1
(58) Field of Classification Search .............. None
See application file for complete search history.

(56) References Cited

U.S. PATENT DOCUMENTS

| 5,325,352 | A  | * | 6/1994 | Matsumoto | 369/275.1 |
| 5,856,962 | A  | * | 1/1999 | Inagawa et al. | 369/47.19 |
| 6,714,432 | B2 | * | 3/2004 | Tomioka et al. | 369/53.32 |
| 2003/0156338 | A1 | * | 8/2003 | Kudo et al. | 360/15 |

FOREIGN PATENT DOCUMENTS

| JP | 2000-132948 | 5/2000 |
| KR | 1997-0016913 | 4/1997 |

OTHER PUBLICATIONS

Nic John, "CloneCD Guide—p. 1" URL: <www.sitepalace.com/johngr>, Aug. 31, 2002, Retrieved on Oct. 20, 2004. the whole document.
Robert Bruce Thompson, et al, "Coaster-Free Burning with the IDE CD Writers: Part 3," *Windows O'Reilly (Online)*, URL: <www.windowsdevcenter.com/pub/a/oreilly/windows/news/pchardnut3_1000.html>, Oct. 30, 2000, Retrieved on Oct. 20, 2004. the whole document.
Patent Abstracts of Japan: Japanese Publication No. 04-114384, Publication Date: Apr. 15, 1992. Abstract Only.

\* cited by examiner

*Primary Examiner*—Than Nguyen
(74) *Attorney, Agent, or Firm*—Staas & Halsey LLP (57) ABSTRACT

A method of recording record signals sequentially transmitted from a host on an optical recording medium. The method includes receiving record data sequentially transmitted from the host and storing the received record data in a buffer if a predetermined environment for a data recording apparatus which records data on an optical recording medium to record the received data is set, building information on the optical recording medium using record data to be recorded in a lead-in region of the optical recording medium among the record data stored in the buffer, and signal-processing the record data stored in the buffer and sequentially recording the signal-processed data on the lead-in region, a program region, and a lead-out region of the optical recording medium.

15 Claims, 5 Drawing Sheets

RECORDING METHOD AND RECORDING APPARATUS USING SAME

CROSS-REFERENCE TO RELATED APPLICATIONS

This application claims the benefit of Korean Patent Application No. 2002-60967, filed Oct. 7, 2002, in the Korean Intellectual Property Office, the disclosure of which is incorporated herein by reference.

BACKGROUND OF THE INVENTION

1. Field of the Invention

The present invention relates to an apparatus and a method for writing data on an optical recording medium, and more particularly, to an apparatus and a method for reducing recording time by building TOC information on data transmitted from a host and then recording data on an optical recording medium in a raw mode.

2. Description of the Related Art

Amid fierce competition among manufacturers of high-speed recording apparatuses, recording speed has been one of the most important factors in determining the performance of an entire recording apparatus. There are various methods for recording data on an optical recording medium using a recording drive including, for example, a track-at-once mode recording method in which data is recorded on an optical recording medium on a track-by-track basis, a session-at-once mode recording method in which data is recorded on an optical recording medium on a session-by-session basis, a disk-at-once mode recording method in which data is recorded on an optical recording medium on a disk-by-disk basis, and a raw mode recording method in which data is sequentially recorded on an optical recording medium ranging from a lead-in region to a lead-out region.

Figure 1A:
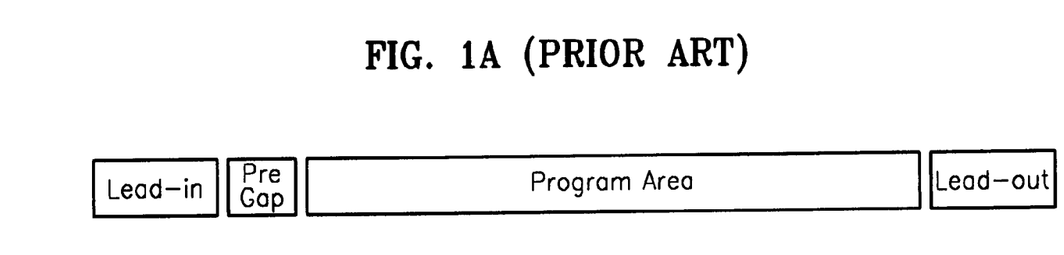
FIGS. 1A and 1B are diagrams illustrating the structure of a conventional optical recording medium an a conventional raw mode recording method, respectively.
Figure 1B:
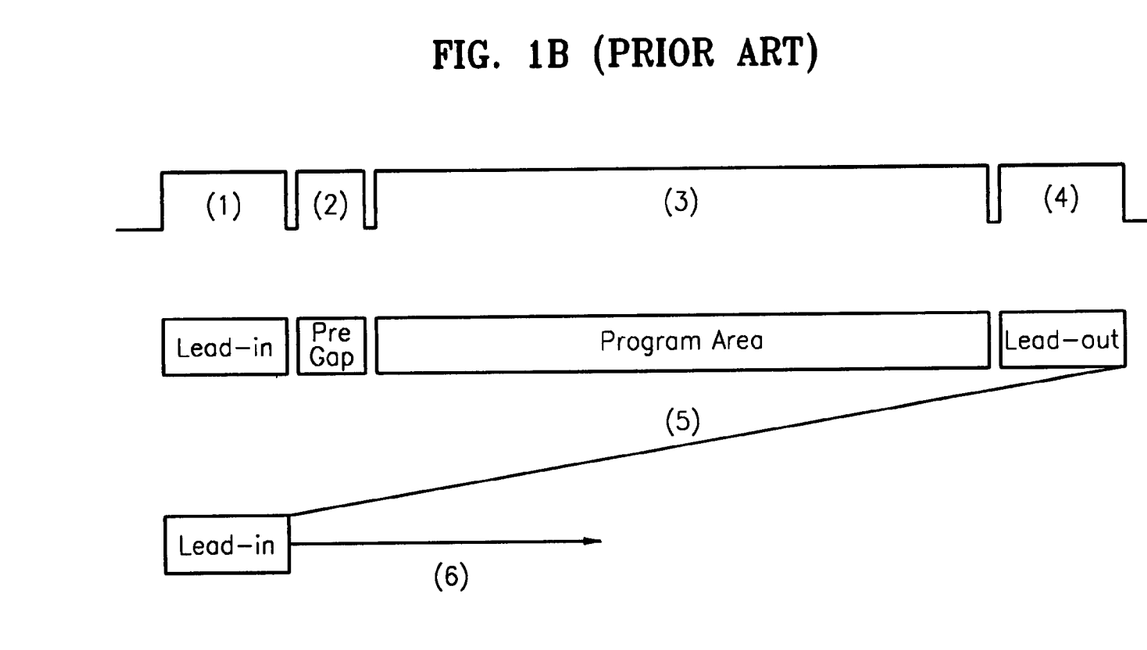

FIGS. 1A and 1B are diagrams illustrating a conventional raw mode recording method. More specifically, FIG. 1A is a diagram illustrating the structure of an optical recording medium. In general, an optical recording medium is comprised of three different signal regions, i.e., a lead-in region, a program region, and a lead-out region. In the lead-in region, location information of data written on an optical disk, the type of the optical disk, and running time of the data are recorded. The lead-in region is called table of contents (TOC). The program region is a region where a reproduction signal is recorded. The lead-out region is a signal region indicating the end of a program.

FIG. 1B is a diagram illustrating a conventional raw mode recording method. According to the conventional raw mode recording method, data transmitted from a host (not shown) is sequentially recorded on a lead-in region (1), a program region (3) including a pre-gap (2), and a lead-out region (4) of an optical recording medium. After completing the recording of the data on the lead-out region (4), the lead-in region (1), on which the data has already been recorded, is sought using an optical pickup (not shown), through a process which is represented by (5) in FIG. 1B. In order to seek the lead-in region (1), the rotation speed of the optical recording medium must be lowered. After locating the lead-in region (1) using the optical pickup (not shown), the data recorded on the lead-in region (1) is read using the optical pickup, and information on the optical recording medium is built, thus completing the whole recording process (6).

When the host (not shown) issues a record command and a predetermined amount of data is stored in a buffer memory (not shown) of the recording apparatus, a data recording process begins. While recording data on the optical recording medium, the recording apparatus receives data from the host and keeps checking if the data received from the host is recorded on the optical recording medium in a normal way. When the host issues a synchronize cache command to make the recording apparatus stop the recording, data that still remains in the buffer memory, i.e., data that has not yet been transferred from the buffer memory on to the optical recording medium, is all recorded on the optical recording medium. Thereafter, in order to figure out the data recorded on the optical recording medium, it is necessary to seek the lead-in region of the optical recording medium and then read TOC information from the lead-in region. By reading the TOC information from the lead-in region, it is possible to obtain information on the optical recording medium, such as a start track and an end track of the optical recording medium, the type of the optical recording medium, the way the data received from the host has been recorded on the optical recording medium, the number of tracks of the optical recording medium, and the type of the data recorded on the optical recording medium. The process of obtaining the information on the optical recording medium is included in data recording time, and it takes about 10 seconds. Therefore, the entire data recording time may be greatly and/or undesirably affected by such overhead time.

SUMMARY OF THE INVENTION

The present invention provides a method of reducing recording time by building TOC information on data transmitted from a host and then recording data on an optical recording medium in a raw mode.

The present invention also provides an apparatus for reducing recording time by building TOC information on data transmitted from a host and then recording data on an optical recording medium in a raw mode.

Additional aspects and/or advantages of the invention will be set forth in part in the description which follows and, in part, will be obvious from the description, or may be learned by practice of the invention.

According to an aspect of the present invention, there is provided a method of recording record signals sequentially transmitted from a host on an optical recording medium. The method includes receiving record data sequentially transmitted from the host and storing the received record data in a buffer if an environment for a data recording apparatus on the optical recording medium to record the received data is set, building information on the optical recording medium using the record data to be recorded in a lead-in region of the optical recording medium among the record data stored in the buffer, and signal-processing the record data stored in the buffer and sequentially recording the signal-processed data on the lead-in region, a program region, and a lead-out region of the optical recording medium.

The method may further include notifying the host, after the signal processing, that recording of the signal-processed data on the optical recording medium has been completed.

The information on the optical recording medium may be built using a 16 byte-SubQ value or a 96 byte-Subcode value from among the record data received from the host depending on a block type of the record data.

The building may include identifying the number of blocks if the 16 byte-SubQ value exists among the record data to be recorded in the lead-in region of the optical recording medium, stored in the buffer, interpreting a SubQ value of each of the identified blocks, and building the information on the optical recording medium using an index value in the interpreted SubQ value of each of the identified blocks.

The building may include identifying the number of blocks if the 96 byte-Subcode value exists among the record data to be recorded in the lead-in region of the optical recording medium, stored in the buffer, deducing a SubQ value of each of the identified blocks from the 96 byte-Subcode value, interpreting a Subcode value of each of the identified blocks, and building the information on the optical recording medium using an index value in the interpreted Subcode value of each of the identified blocks.

According to another aspect of the present invention, there is provided an apparatus for recording record signals sequentially transmitted from a host on an optical recording medium. The apparatus includes a storing section which receives and stores record data sequentially transmitted from the host, and a control section which builds information on the optical recording medium using the record data to be recorded on a lead-in region of the optical recording medium among the record data stored in the storing section and controls the record data stored in the storing section to be sequentially recorded on the lead-in region, a program region, and a lead-out region of the optical recording medium.

When recording of the record data stored in the storing section on the optical recording medium is completed, the control section may transmit a record-end signal to the host.

The control section may build the information on the optical recording medium using a 16 byte-SubQ value or a 96 byte-Subcode value from among the record data received from the host, depending on a block type of the record data.

The control section may build the information on the optical recording medium using the 16 byte-SubQ value which exists among the record data to be recorded on the lead-in region of the optical recording medium by identifying a number of blocks, interpreting a SubQ value of each of the identified blocks, and using an index value in the interpreted SubQ value of each of the identified blocks.

The control section may build the information on the optical recording medium using the 96 byte-Subcode value by identifying the number of blocks, deducing a SubQ value of each of the identified blocks from the 96 byte-Subcode value, interpreting a Subcode value of each of the identified blocks, and using an index value in the interpreted Subcode value of each of the identified blocks.

According to yet another aspect of the present invention, there is provided a recording apparatus. The recording apparatus includes: a buffer section which stores data, has a storage capacity, and has a buffer mode including a recording mode; a recording section which records data onto a storage medium in recording mode which includes a raw recording mode; a table of contents (TOC) building section which builds TOC information using one of a SubQ value and a Subcode from the received data; a control section which manages the buffer section so that the storage capacity is not exceeded, monitors the storage capacity of the buffer section, and changes the buffer mode to recording when the storage capacity is met. When the buffer mode is set to recording the recording section is set to the raw recording mode.

According to yet another aspect of the present invention, there is provided a data recording method including: processing a record command; forming an appropriate recording power and setting an appropriate recording speed; initializing an encoder; receiving data from a host and managomg a buffer; setting an encoder mode and starting sector processing; building information using one of a SubQ value and a Subcode value of the received data; setting recording parameters and moving an optical pickup over desired location of an optical medium; recording the received data from a lead-in region to a lead-out region; and notifying the host of completion of data recording.

According to yet another aspect of the present invention, there is provided a data recording method including: processing a record command; forming an appropriate power and setting an appropriate recording speed; and initializing an encoder; receiving data from a host; setting a buffer to a raw recording mode; building table of contents information for the received data; and recording the received data on the optical medium after the building.

BRIEF DESCRIPTION OF THE DRAWINGS

These and/or other aspects and advantages of the invention will become apparent and more readily appreciated from the following description of the preferred embodiments taken in conjunction with the accompanying drawings in which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
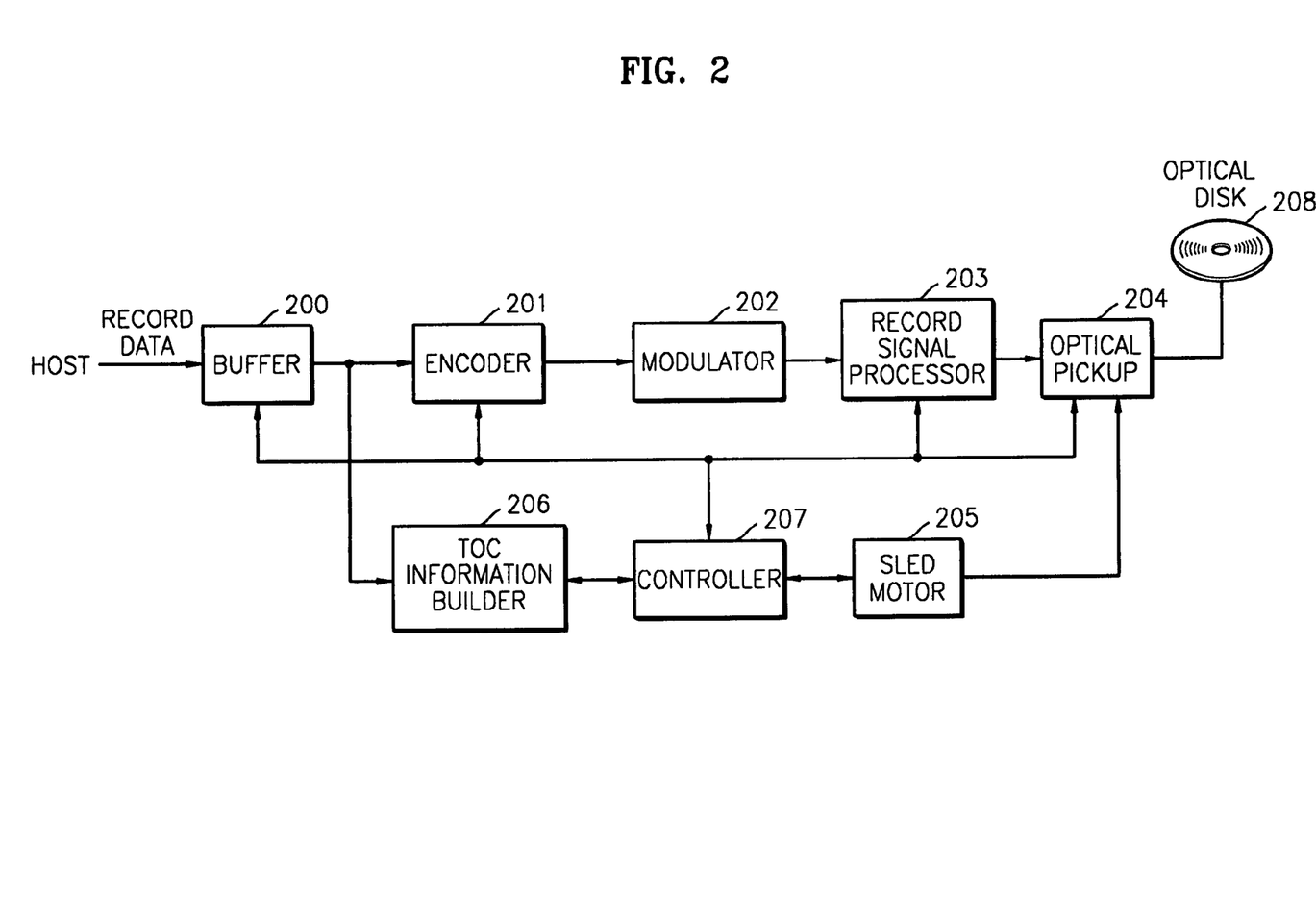
FIG. 2 is a block diagram of an apparatus for reducing recording time according to a first embodiment of the present invention.

FIG. 2 is a block diagram of an apparatus for reducing recording time according to a first embodiment of the present invention. The apparatus for reducing recording time includes a buffer 200, an encoder 201, a modulator 202, a record signal processor 203, an optical pickup 204, a sled motor 205, a table of contents (TOC) information builder 206, a controller 207. The apparatus records to and/or reads from an optical disk 208.

Figure 3:
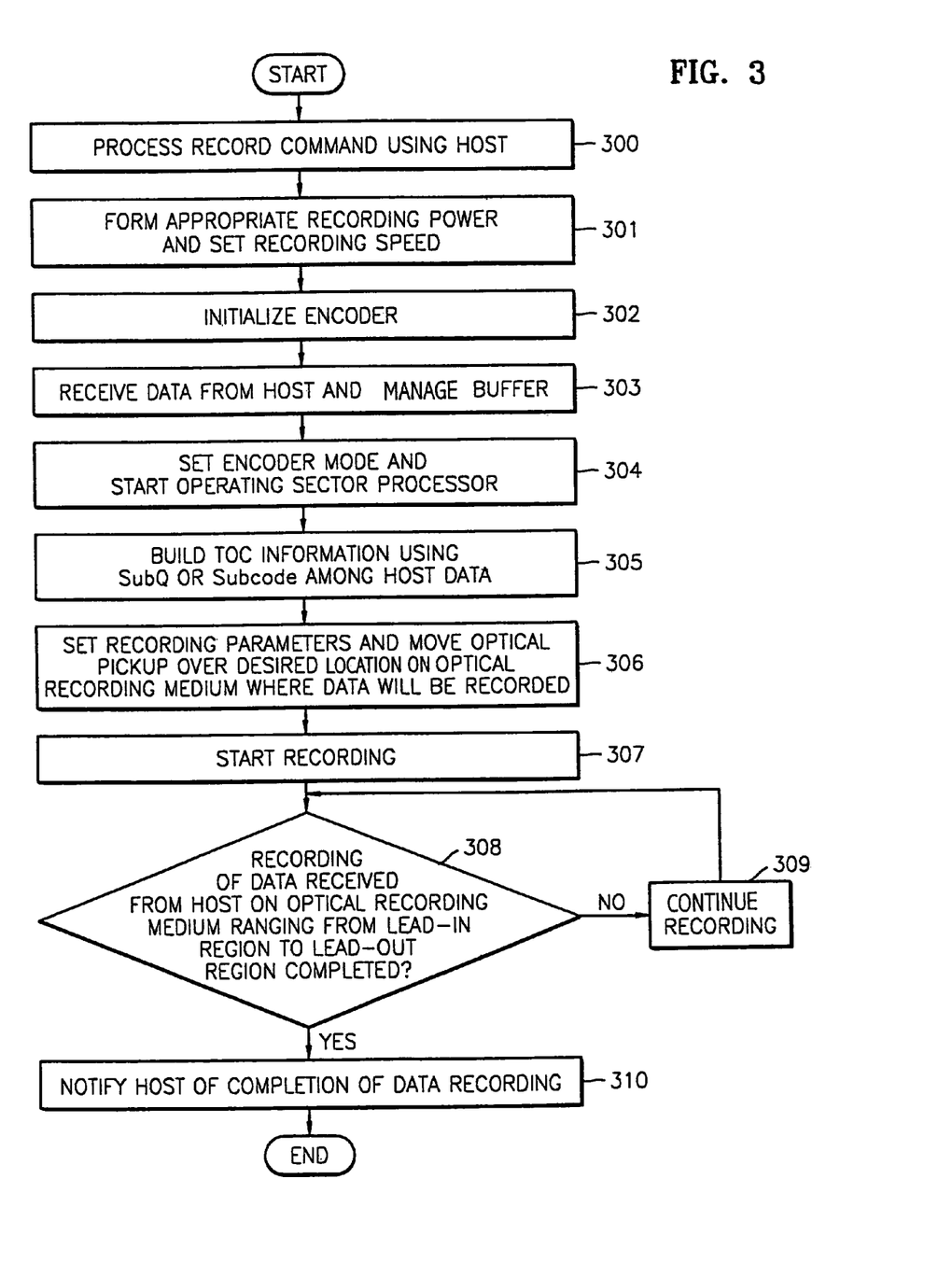
FIG. 3 is a flowchart of a method for reducing recording time according to an embodiment of the present invention.

FIG. 3 is a flowchart of a method of reducing recording time according to a an embodiment of the present invention. Referring to FIG. 3, the method of reducing recording time includes processing a record command issued by a host in operation 300, forming an appropriate recording power and setting an appropriate recording speed in operation 301, initializing an encoder as part of preparations for recording data in operation 302, receiving data from the host and managing a buffer in operation 303, setting the mode of the encoder and starting to operate a sector processor in operation 304, building TOC information using a SubQ or Subcode value out of host data in operation 305, setting a record parameter value and moving an optical pickup over a location of an optical recording medium on which data will be recorded in operation 306, starting to record data in operation 307, determining whether or not recording of the data received from the host is completed in operation 308, continuing the recording of the data received from the host in operation 309, and notifying the host of completion of the recording of the data received from the host in operation 310.

Figure 4:
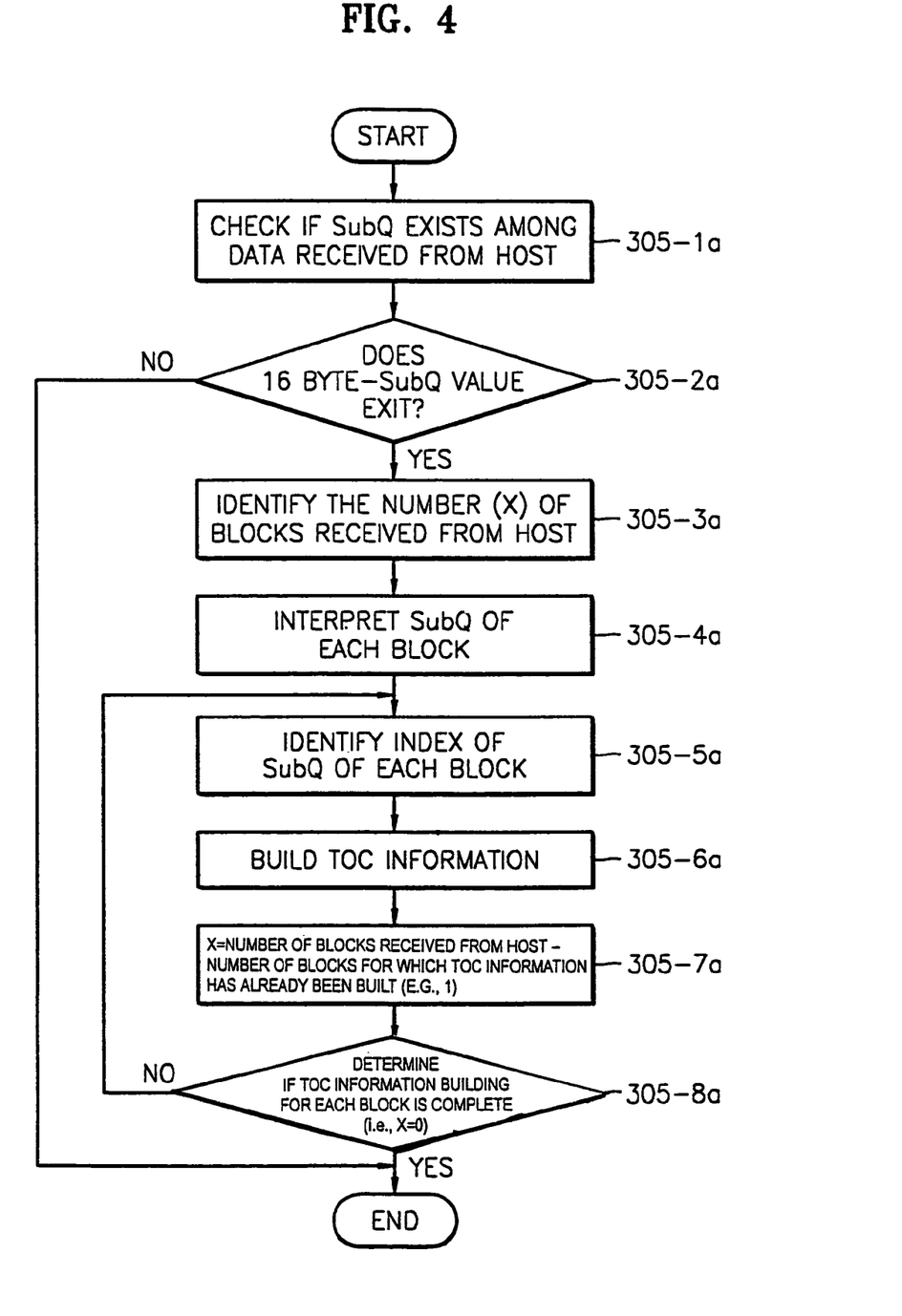
FIG. 4 is a flowchart of a process of building TOC information, in the method shown in FIG. 3, according to an embodiment of the present invention.

FIG. 4 is a flowchart of a process of building TOC information according to a third embodiment of the present invention. Referring to FIG. 4, the process of building TOC information includes checking if a SubQ value exists among data received from a host in operation 305-1a, determining if a 16-byte SubQ exists in operation 305-2a, identifying the number of blocks received from the host in operation 305-3a, interpreting a SubQ value of each of the blocks received from the host in operation 305-4a, identifying an index value in the interpreted SubQ value for each of the blocks in operation 305-5a, building TOC information in operation 305-6a, subtracting the number of blocks for which TOC information has already been built from the number of blocks received from the host in operation 305-7a, and determining if building of TOC information for each of the blocks received from the host is completed in operation 305-8a.

Figure 5:
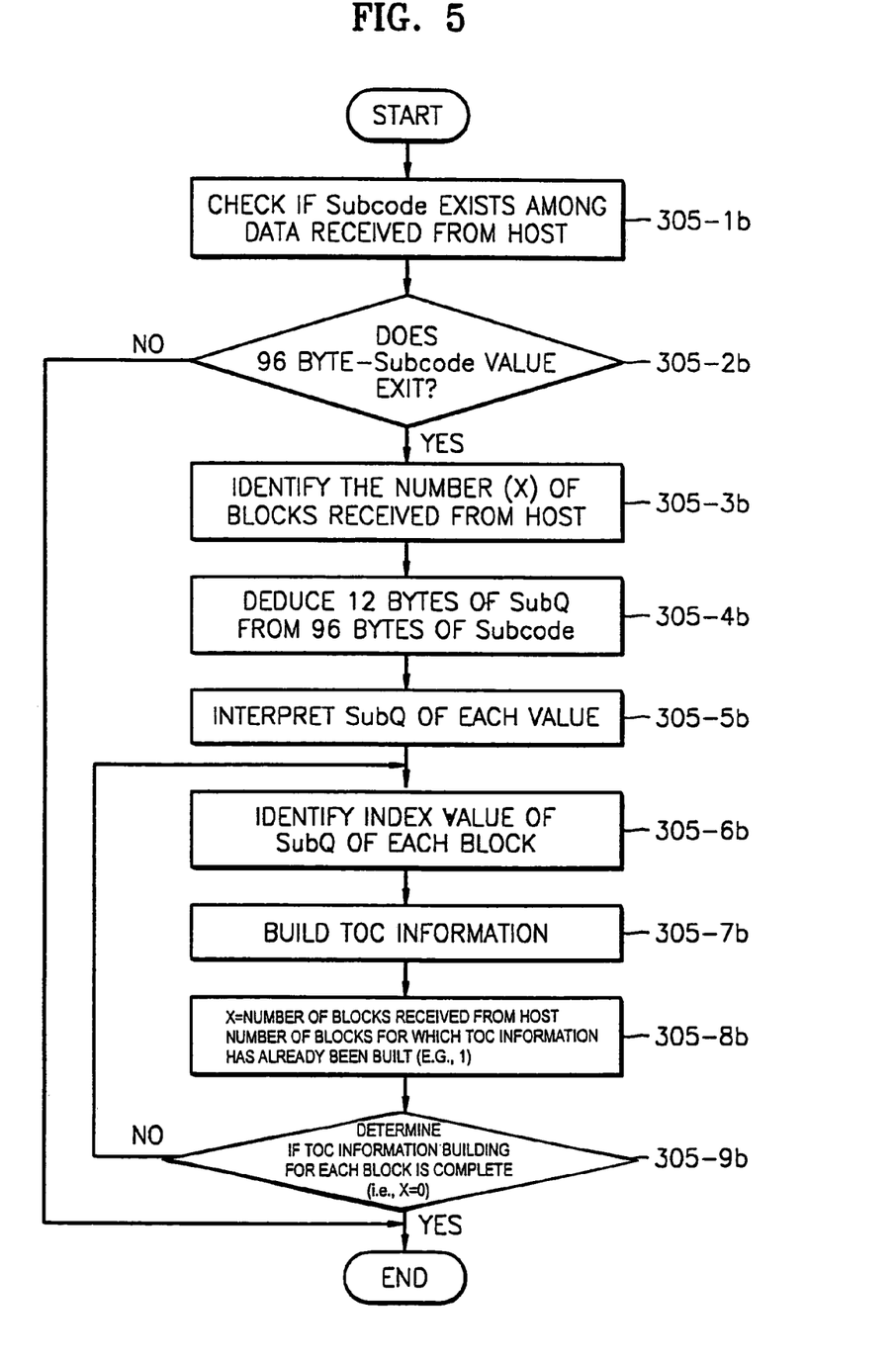
FIG. 5 is a flowchart of a process of building TOC information, in the method shown in FIG. 3, according to an embodiment of the present invention.

FIG. 5 is a flowchart of a process of building TOC information according to a fourth embodiment of the present invention. Referring to FIG. 5, the process of building TOC information includes identifying whether a Subcode value exists among data received from a host in operation 305-1b, determining whether 96-byte Subcode exists among the received data in operation 305-2b, identifying the number of blocks received from the host in operation 305-3b, deducing a 12 byte-SubQ value from a 96 byte-Subcode value in operation 304-4b, interpreting a SubQ value for each of the blocks received from the host in operation 305-5b, identifying an index value in the interpreted SubQ value for each of the blocks in operation 305-6b, building TOC information in operation 305-7b, subtracting the number of blocks for which TOC information has already been built from the number of blocks received from the host in operation 305-8b, and determining whether or not building of TOC information for each of the blocks received from the host is completed in operation 305-9b.

The present invention will be described in even greater detail with reference to FIGS. 2 through 5.

A host processes a record command in operation 300. The host receives the record command from an application program and determines whether to record host data on the optical disk 208 or not. If predetermined data is being recorded on the optical disk 208, the controller 207 notifies the host of an error.

Thereafter, in operation 301, the controller 207 forms an appropriate recording power for an optical recording apparatus and sets an appropriate recording speed of the optical recording apparatus. The controller 207 determines whether the optical disk 208 is a CD-R or a CD-RW, and sets a recording speed and a recording speed of the optical recording apparatus depending on the type of the optical disk 208.

Thereafter, in operation 302, the controller 207 initializes the encoder 201. The encoder 201 encodes data transmitted from the host. Initializing the encoder 201, the controller 207 initializes variables, sets interrupt for the encoder 201, and initializes the buffer 200 necessary to record data on the optical disk 208.

Thereafter, in operation 303, the controller 207 controls and manages the data received from the host so that the received data can be stored in the buffer 200. The controller 207 controls the data received from the host so that only as much data as the storage capacity of the buffer 200 is received while checking the storage capacity of the buffer 200. Thus, the controller manages the buffer. The controller 207 increases a pointer value of the buffer 200 one by one whenever data is received from the host and determines whether to convert a current mode of the buffer 200 into a recording mode or not based on the pointer value of the buffer 200. If the buffer 200 does not have any space to store the data received from the host (i.e., the point value exceeds a threshold), the controller 207 converts the current mode of the buffer 200 into a recording mode.

When the buffer 200 enters into the recording mode, a mode of the encoder 201 is set, and a sector processor starts operating in operation 304. In other words, the mode of the encoder 201 is set to be a raw mode, and the sector processor starts operating.

When the sector processor starts operating, TOC information is built using SubQ or Subcodes values among the host data in operation 305. In the case of recording data on the optical disk 208 in a raw mode, lead-in information can be extracted from the host using two different methods.

In a case where the type of a data block is represented by a value of 1, raw data, and 2368 bytes of 16 byte-P sub-channel values and 16-byte Q sub-channel values are transmitted from the host. TOC information can be built using the P and Q sub-channel values, a process which is shown in FIG. 4.

The controller 207 checks if a SubQ value exists among the data received from the host in step 305-1a. SubQ contains the TOC information of the optical disk 208.

If there exists a SubQ value among the received data, the controller 207 determines whether a 16 byte-SubQ value exists among the received data in operation 305-2a.

If the 16 byte-SubQ value exists, the controller 207 identifies the number X of blocks received from the host in operation 305-3a.

Thereafter, the controller 207 interprets a SubQ value of each of the blocks received from the host in operation 305-4a. A SubQ value is shown in the following table.

TABLE 1

| Offset | Definition | Meaning |
|---|---|---|
| 1 | Control value (4 bits) | Frame information |
|  | ADR value (4 bits) | Block mode value |
| 2 | TNO (8 bits) | Track number |
| 3 | INDEX (8 bits) | 01h (in general) |
| 4 | RMIN (8 bits) | Relative minute address |
| 5 | RSEC (8 bits) | Relative second address |
| 6 | RFRM (8 bits) | Relative frame address |
| 7 | 00 | Fixed at 00 |
| 8 | AMIN | Absolute minute address |
| 9 | ASEC | Absolute second address |
| 10 | AFRM | Absolute frame address |
| 11 | CRC 0 | CRC value |
| 12 | CRC 1 | CRC value |

When the SubQ value of each of the blocks is interpreted based upon Table 1 above, the controller 207 identifies an index value in the interpreted SubQ value of each of the blocks in operation 305-5a. The index value is comprised of 8 bits.

The controller 207 extracts TOC information from the 8-bit index value and stores the extracted TOC information in the TOC information builder 206. For example, if an index value is represented by A0, its corresponding TOC information is stored in an A0 management buffer (not shown) in the TOC information builder 206. Here, A0 represents a first track number of the optical disk 208. If an index value is represented by A1, its corresponding TOC information is stored in an A1 management buffer (not shown) in the TOC information builder 206. Here, A1 represents a last track number. If an index value is represented by A2, its corresponding TOC information is stored in an A2 management buffer (not shown) in the TOC information builder 206. Here, A2 represents a start address of a lead-out region of the optical disk 208.

After the process of building TOC information for a predetermined block by identifying an index value for the predetermined block is completed, the controller 207 subtracts the number of blocks for which TOC information has already been built from the number of blocks received from the host, for example, subtracts 1 from X, in operation 305-7a.

The controller 207 determines whether or not TOC information for all the blocks received from the host has been built and completes the entire process in operation 305-8a.

In a case where the type of a data block is represented by a value of 2, raw data and a total of 2448 bytes of P-W subchannel values, including a 96-byte subcode value, are transmitted from the host. TOC information can be built using the 96-byte subcode value, a process which is shown in FIG. 5.

The controller 207 checks if a Subcode value exists among the data received from the host in operation 305-1b.

If a Subcode value exists among the received data, the controller 207 checks if a 96 byte-Subcode value exist among the received data in operation 305-3b.

If the 96 byte-Subcode value exists among the received data, the controller 207 identifies the number X of blocks received from the host in operation 305-3b.

Thereafter, the controller 207 deduces a 12 byte-SubQ value from the 96 byte-Subcode value of each of the blocks received from the host in operation 304-4b.

Thereafter, the controller 207 interprets a SubQ value of each of the received blocks in operation 305-5b. A SubQ value can be interpreted based on Table 1.

Thereafter, the controller 207 identifies an index value in the interpreted SubQ value of each of the received blocks in operation 305-6b. The index value is comprised of 8 bits.

The controller 207 builds TOC information using the index value of each of the received blocks and stores the TOC information in the TOC information builder 206 in operation 305-7b. For example, if an index value is represented by A0, its corresponding TOC information is stored in an A0 management buffer (not shown) in the TOC information builder 206. Here, A0 represents a first track number of the optical disk 208. If an index value is represented by A1, its corresponding TOC information is stored in an A1 management buffer (not shown) in the TOC information builder 206. Here, A1 represents a last track number. If an index value is represented by A2, its corresponding TOC information is stored in an A2 management buffer (not shown) in the TOC information builder 206. Here, A2 represents a start address of a lead-out region of the optical disk 208.

After the process of building TOC information for a predetermined block by identifying an index value for the predetermined block is completed, the controller 207 subtracts the number of blocks for which TOC information has already been built from the number of blocks received from the host, for example, subtracts 1 from X, in operation 305-8b.

The controller 207 determines whether or not TOC information for all the blocks received from the host has been built and completes the entire process in operation 305-9b.

Thereafter, in step 306, the controller 207 sets a recording parameter value and operates the sled motor 205 in order to move the optical pickup 204 over a desired place of the optical disk 208 where the data received from the host will be recorded.

When the optical pickup 204 is moved over the desired place on the optical disk 208, recording of the received data begins in operation 307. The encoder 201 encodes data output from the buffer 200, the modulator 202 modulates the encoded data, and the record signal processor 203 processes the modulated data into a recordable signal. Thereafter, the recordable signal is recorded on the optical disk 208 using the optical pickup 204.

In operation 309, the controller 207 determines whether or not recording of the received data on the optical disk 208 from a lead-in region to a lead-out region is completed and keeps recording the received data on the optical disk 208 if the entire recording process is not over yet.

Otherwise, the controller 207 notifies the host of completion of the entire recording process in operation 310.

According to above-described embodiments of the present invention, there is no need to move an optical pickup over a lead-in region of an optical disk again after recording data on the optical recording medium, in order to build information on the optical disk, because in a raw recording mode, TOC information is built first for data received from a host and then the received data is recorded on the optical disk. Thus, data recording time can be reduced.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. A method of recording record signals sequentially transmitted from a host on an optical recording medium, the method comprising:
receiving record data sequentially transmitted from the host and storing the received record data in a buffer if a predetermined environment for a data recording apparatus on the optical recording medium to record the received data is set;
building table of contents information using the record data to be recorded in a lead-in region of the optical recording medium among the record data stored in the buffer, wherein the building table of contents information includes;
for a first block type of the record data, identifying a number of blocks if a 16 byte-SubQ value exists among the record data stored in the buffer,
interpreting a SubQ value of each of the identified blocks,
and building the information on the optical recording medium using an index value in the interpreted SubQ value of each of the identified blocks; and
sequentially recording the data in a raw recording mode on the lead-in region, a program region, and a lead-out region of the optical recording medium.

2. The method of claim 1, further comprising notifying the host, after signal processing, that recording of signal-processed data on the optical recording medium has been completed.

3. The method of claim 1, wherein the index value comprises 8 bits.

4. The method of claim 1, wherein the index value identifies one of a first track number of an optical disk, a last track number of an optical disk, and a start address of a lead-out region of an optical disk.

5. The method of claim 1, wherein when a block type of the record data is a second block type, different than the first block type, the building table of contents information comprises:

identifying the number of blocks if a 96 byte-Subcode value exists among the record data to be recorded in the lead-in region of the optical recording medium, stored in the buffer;

deducing a SubQ value of each of the identified blocks from the 96 byte-Subcode value;

interpreting a Subcode value of each of the identified blocks; and building the information on the optical recording medium using an index value in the interpreted Subcode value of each of the identified blocks.

6. An apparatus for recording record signals sequentially transmitted from a host on an optical recording medium, the apparatus comprising:

a storing section which receives and stores record data sequentially transmitted from the host; and a control section which builds table of contents information using the record data to be recorded on a lead-in region of the optical recording medium among the record data stored in the storing section, and controls the record data stored in the storing section to be sequentially recorded in a raw recording mode on the lead-in region, a program region, and a lead-out region of the optical recording medium, wherein the building table of contents information includes;

for a first block type of the record data, identifying a number of blocks if a 16 byte-SubQ value exists among the record data stored in the buffer, interpreting a SubQ value of each of the identified blocks, and building the information on the optical recording medium using an index value in the interpreted SubQ value of each of the identified blocks.

7. The apparatus of claim 6, wherein, when recording of the record data stored in the storing section onto the optical recording medium is completed, the control section transmits a record-end signal to the host.

8. The apparatus of claim 6, wherein when a block type of the record data is a second block type, different than the first block type, the control section builds the table of contents information on the optical recording medium using a 96 byte-Subcode value by identifying the number of blocks stored in the storage section, deducing a SubQ value of each of the identified blocks from the 96 byte-Subcode value, interpreting Subcode of each of the identified blocks, and using an index value in the interpreted Subcode of each of the identified blocks.

9. The apparatus of claim 8, wherein the index value comprises 8 bits.

10. The apparatus of claim 8, wherein the index value identifies one of a first track number of an optical disk, a last track number of an optical disk, and a start address of a lead-out region of an optical disk.

11. The apparatus of claim 6, wherein the index value comprises 8 bits.

12. The apparatus of claim 6, wherein the index value identifies one of a first track number of an optical disk, a last track number of an optical disk, and a start address of a lead-out region of an optical disk.

13. A recording apparatus, comprising:

a buffer section which stores data, has a storage capacity, and has a buffer mode including a recording mode;

a recording section which records data onto a storage medium in a recording mode which includes a raw recording mode;

a table of contents (TOO) building section which builds TOO information using one of a SubQ value and a Subcode from the received data;

a control section which manages the buffer section so that the storage capacity is not exceeded, monitors the storage capacity of the buffer section, and changes the buffer mode to recording when the storage capacity is met, wherein, when the buffer mode is set to recording, the recording section is set to the raw recording mode, and wherein the TOO building section builds the information on the optical recording medium using a 16 byte-SubQ value which exists among the record data to be recorded in the lead-in region of the optical recording medium by identifying a number of blocks stored in the buffer section, interpreting a SubQ value of each of the identified blocks, and using an index value in the interpreted SubQ value of each of the identified blocks.

14. A recording apparatus, comprising:

a buffer section which stores data, has a storage capacity, and has a buffer mode including a recording mode;

a recording section which records data onto a storage medium in a recording mode which includes a raw recording mode;

a table of contents (TOC) building section which builds TOO information using one of a SubQ value and a Subcode from the received data;

a control section which manages the buffer section so that the storage capacity is not exceeded, monitors the storage capacity of the buffer section, and changes the buffer mode to recording when the storage capacity is met, wherein, when the buffer mode is set to recording, the recording section is set to the raw recording mode, and wherein the TOO building section builds the information on the optical recording medium using a 96 byte-Subcode value by identifying the number of blocks stored in the buffer section deducing a SubQ value of each of the identified blocks from the 96 byte-Subcode value, interpreting Subcode of each of the identified blocks, and using an index value in the interpreted Subcode of each of the identified blocks.

15. A data recording method comprising:

processing a record command;

forming an appropriate recording power and setting an appropriate recording speed;

initializing an encoder;

receiving data from a host and managing a buffer;

setting an encoder mode and starting sector processing;

building information using one of a SubQ value and a Subcode value of the received data;

setting recording parameters and moving an optical pickup over a desired location of an optical medium;

recording the received data from a lead-in region to a lead-out region; and notifying the host of completion of data recording, wherein the TOC building section builds the information on the optical recording medium using either a 16 byte-SubQ value which exists among the received data by identifying a number of blocks stored in the buffer, interpreting a SubQ value of each of the identified blocks, and using an index value in the interpreted SubQ value of each of the identified blocks, or a 96 byte-Subcode value by identifying the number of blocks stored in the buffer, deducing a SubQ value of each of the identified blocks from the 96 byte-Subcode value, interpreting Subcode of each of the identified blocks, and using an index value in the interpreted Subcode of each of the identified blocks.

* * * * *

UNITED STATES PATENT AND TRADEMARK OFFICE
CERTIFICATE OF CORRECTION

PATENT NO. : 7,725,649 B2  Page 1 of 1
APPLICATION NO. : 10/674477
DATED : May 25, 2010
INVENTOR(S) : Young-sig Kwon It is certified that error appears in the above-identified patent and that said Letters Patent is hereby corrected as shown below:

Column 9, Line 63 delete "(TOO)" and insert --(TOC)--.

Column 9, Line 64 delete "TOO" and insert --TOC--.

Column 10, Line 7 (Approx.) delete "TOO" and insert --TOC--.

Column 10, Line 21 delete "TOO" and insert --TOC--.

Column 10, Line 29 (Approx.) delete "TOO" and insert --TOC--.

Column 10, Line 32 (Approx.) delete "section" and insert --section,--.

Signed and Sealed this

Twenty-eighth Day of September, 2010

David J. Kappos
*Director of the United States Patent and Trademark Office*